(12) United States Patent
Kim et al.

(10) Patent No.: US 7,946,192 B2
(45) Date of Patent: May 24, 2011

(54) ORGAN TYPE ACCELERATOR PEDAL APPARATUS

(75) Inventors: Eunsik Kim, Daegu (KR); Yangrae Cho, Hwaseong-si (KR); Taehoon Jang, Gyeongsan-si (KR)

(73) Assignees: Hyundai Motor Company, Seoul (KR); Kia Motors Corporation, Seoul (KR); SL Corporation, Dae Gu (KR)

( * ) Notice: Subject to any disclaimer, the term of this patent is extended or adjusted under 35 U.S.C. 154(b) by 211 days.

(21) Appl. No.: 12/324,146

(22) Filed: Nov. 26, 2008

(65) Prior Publication Data

US 2009/0293666 A1 Dec. 3, 2009

(30) Foreign Application Priority Data

Jun. 2, 2008 (KR) .................. 10-2008-0051587

(51) Int. Cl.
*G05G 1/30* (2008.04)
(52) U.S. Cl. ........................................... 74/513
(58) Field of Classification Search ............ 74/512, 74/513, 560
See application file for complete search history.

(56) References Cited

U.S. PATENT DOCUMENTS

| 3,111,861 A | * | 11/1963 | Young ........................ 74/560 |
| 3,500,702 A | * | 3/1970 | Nautsch et al. ............... 74/560 |
| 5,507,201 A | | 4/1996 | Fairbairn et al. |
| 7,631,574 B2 | * | 12/2009 | Leone ........................ 74/513 |
| 7,717,012 B2 | * | 5/2010 | Kim et al. .................... 74/512 |
| 2005/0217410 A1 | * | 10/2005 | Sakuraba et al. ............ 74/513 |
| 2007/0151398 A1 | * | 7/2007 | Kim et al. .................... 74/513 |
| 2007/0193401 A1 | | 8/2007 | Campbell |
| 2007/0289402 A1 | * | 12/2007 | La et al. ...................... 74/513 |
| 2008/0083295 A1 | | 4/2008 | Kim et al. |
| 2009/0151502 A1 | * | 6/2009 | Kim et al. .................... 74/513 |
| 2010/0132503 A1 | * | 6/2010 | Hong et al. .................. 74/560 |

FOREIGN PATENT DOCUMENTS

| EP | 1 440 858 A1 | 7/2004 |
| JP | 9-290663 | 11/1997 |
| JP | 2004-106776 | 4/2004 |
| JP | 2004-189115 A | 7/2004 |
| JP | 2005-275636 A | 10/2005 |
| KR | 10-0644796 B1 | 11/2006 |
| KR | 10-0816002 B1 | 3/2008 |

* cited by examiner

*Primary Examiner* — Vicky A Johnson
(74) *Attorney, Agent, or Firm* — Morgan, Lewis & Bockius LLP

(57) ABSTRACT

The present invention provides an organ type accelerator pedal apparatus comprising a pedal to which a driver applies a force to rotate a pedal arm; and a pedal bracket to which one end of the pedal is hinge-connected and which includes one or more fitting protrusions, guide protrusions, fitting holes used to be fixed.

13 Claims, 15 Drawing Sheets

ORGAN TYPE ACCELERATOR PEDAL APPARATUS

CROSS-REFERENCE TO RELATED APPLICATION

The present application claims priority to Korean Application Number 10-2008-0051587 filed Jun. 2, 2008, the entire contents of which application is incorporated herein for all purposes by this reference.

BACKGROUND OF THE INVENTION

1. Field of the Invention

The present invention relates to an organ type accelerator pedal apparatus.

2. Description of Related Art

In general, an accelerator pedal apparatus for a vehicle is used to control the amount of air-fuel mixture in the case of a gasoline engine and to control the amount of injected fuel in the case of a diesel engine in order to adjust the engine RPM.

Accelerator pedals are classified into a pendant type accelerator pedal apparatus that is suspended on a dash panel, and an organ type accelerator pedal that is provided on a floor panel, depending on mounting structure.

The pendant type accelerator pedal apparatus is widely used at present, but has a drawback in that a driver is fatigued with bad operation feeling when a driver operates the pendant type accelerator pedal apparatus.

In contrast, the organ type accelerator pedal apparatus overcomes the drawback of the pendant type accelerator pedal apparatus, that is, can reduces fatigue by improving a driver's operation feeling, meet both stability and economical efficiency since being capable of accurately operating a throttle valve, and improve quality by improving appearance in a vehicle cabin. Therefore, the application of the organ type accelerator pedal apparatus has recently increased in a prestige car.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide a pedal bracket for an organ type accelerator pedal apparatus that can improve driver's operation feeling, prevent a driver's ankle from being broken off when a collision accident, and prevent foreign substances from coming in a portion between a pedal and a pedal bracket, thereby preventing the operational errors of the pedal.

In an aspect of the present invention, the organ type accelerator pedal apparatus may includes a pedal, an upper portion of which is pivotally coupled to a lower portion of an pedal arm, the pedal to which a driver applies a force to rotate the pedal arm, and/or a pedal bracket pivotally connected with a lower portion of the pedal, wherein the pedal bracket includes fitting protrusion, guide protrusion, and/or fitting hole used to be fixed to a vehicle body.

The pedal arm may be pivotally coupled to a pedal arm housing fixed to the vehicle body.

The fitting protrusion may include a body protruding downward from lower surface of the pedal bracket, and a protrusion, formed at end portion of the body and protruding in substantially perpendicular direction to the body.

The guide protrusion protrudes downward from lower surface of the pedal bracket and the side surface of the guide protrusion substantially in a traverse direction of the vehicle body may be inclined so that width of upper portion at the guide protrusion in the traverse direction of the vehicle body is decreased toward a tip thereof.

The pedal bracket may include a lower fixing portion which is formed in parallel to a portion of the vehicle body to which the pedal bracket is fixed, wherein the lower portion of the pedal is rotatably hinge-connected thereto, and/or an upper fixing portion, one end of which is integrally connected to the lower fixing portion and the other end of which is formed to be inclined upward toward a front side of the vehicle body.

The fitting hole may be configured to passes through upper and lower surfaces of the lower fixing portion. The fitting protrusion may be configured to protrude downward from lower surface of the upper fixing portion. The fitting protrusion may be configured to protrude downward from lower surface of the lower fixing portion. A front face of the upper fixing portion, which faces forward when the pedal bracket is seen above the vehicle body, may be formed in a V shape. A connection portion between the front face and the lower fixing portion may be formed in the shape of a quadrangular flat plane. When a reference line is set to divide the distance between side surfaces into equal distances from a sharp vertex of the front face to the lower fixing portion in the upper fixing portion, a left upper surface and a right upper surface, which are provided on both sides of the reference line, may form surfaces that are inclined downward toward the side surfaces of the upper fixing portion, respectively.

The vehicle body to which the pedal bracket is fixed may be a floor panel, which is provided below a driver's seat and includes holes into which the fitting protrusion, and/or the guide protrusion are fitted and/or a hole communicating with the fitting hole. The hole, to which the guide protrusion of the pedal bracket is fitted, among the holes formed at the vehicle body, may be an elongated groove of which both ends are elongated in a traverse direction of the vehicle body.

In another aspect of the present invention, the organ type accelerator pedal apparatus may further include a vehicle body bracket that includes holes into which the fitting protrusion and/or the guide protrusion are fitted so as to be fixed to the pedal bracket and/or a hole communicating with the fitting hole formed on the pedal bracket, and is fixed to the floor panel below a driver's seat. Among the holes formed at the vehicle body bracket, one hole to which the fitting protrusion of the pedal bracket is fitted may be cut to one side surface of the vehicle body bracket to form a slot. The width of fitting protrusion and guide protrusion may be smaller than the holes of the vehicle body bracket coupled respectively therebetween.

In further another aspect of the present invention, the upper portion of the pedal and the lower portion of the pedal arm may be coupled by a pedal connection module including a ball joint housing connected to the pedal arm and a ball joint member connected to the pedal.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

DETAILED DESCRIPTION OF THE INVENTION

Figure 1:
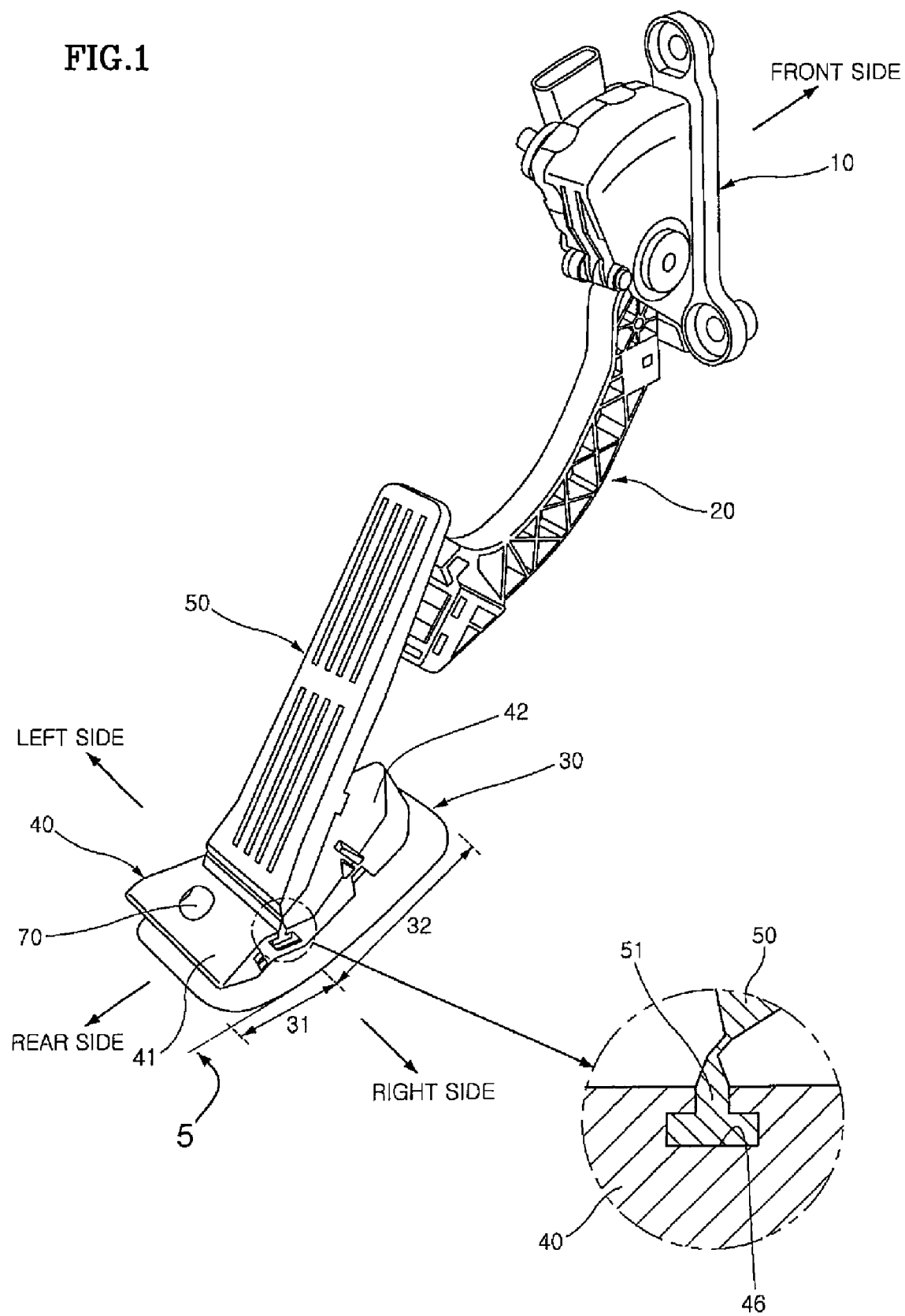
FIGS. 1 to 3 are a perspective view, a side view, and an exploded perspective view of an exemplary organ type accelerator pedal apparatus according to the present invention.
Figure 2:
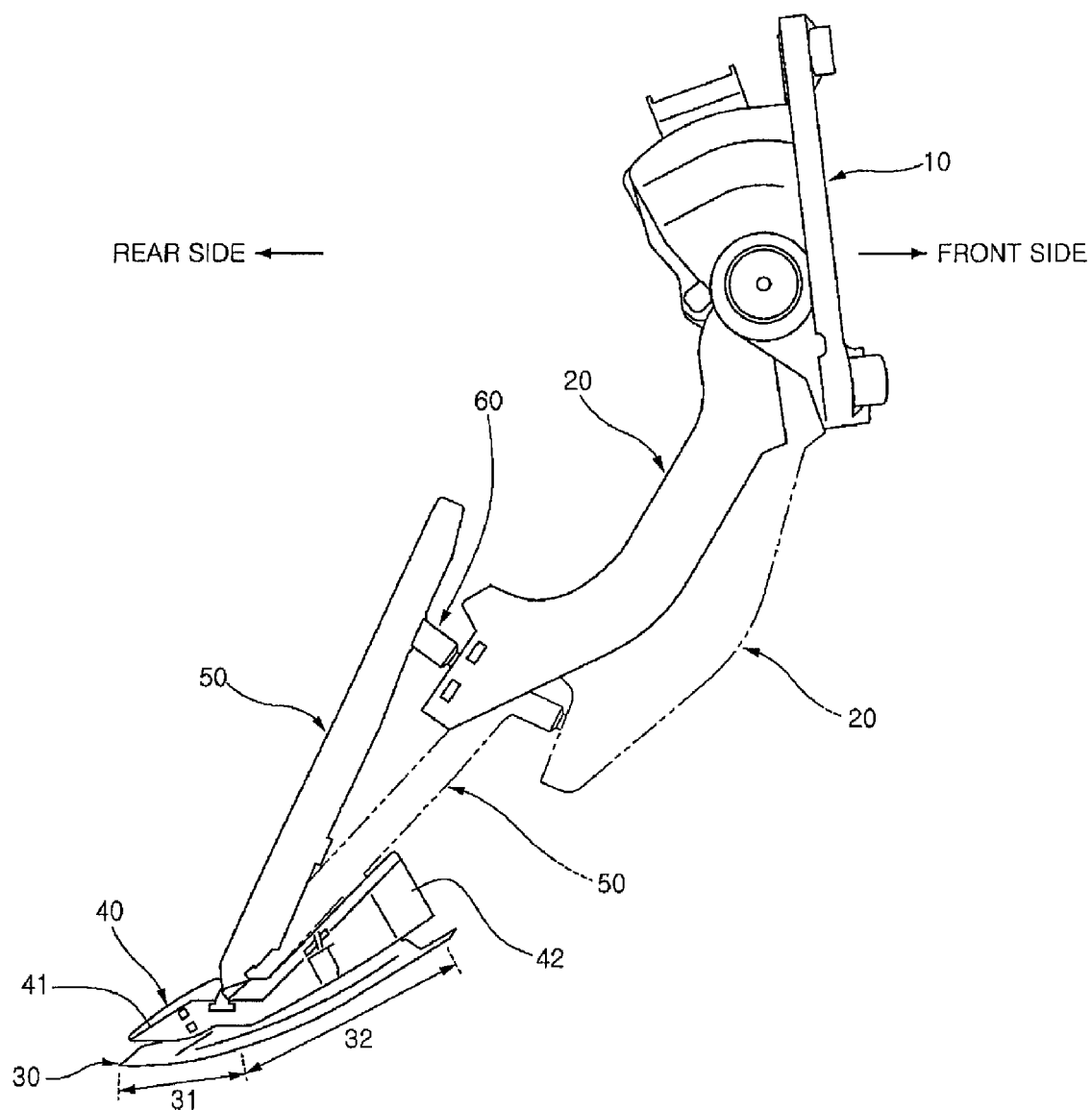
Figure 3:
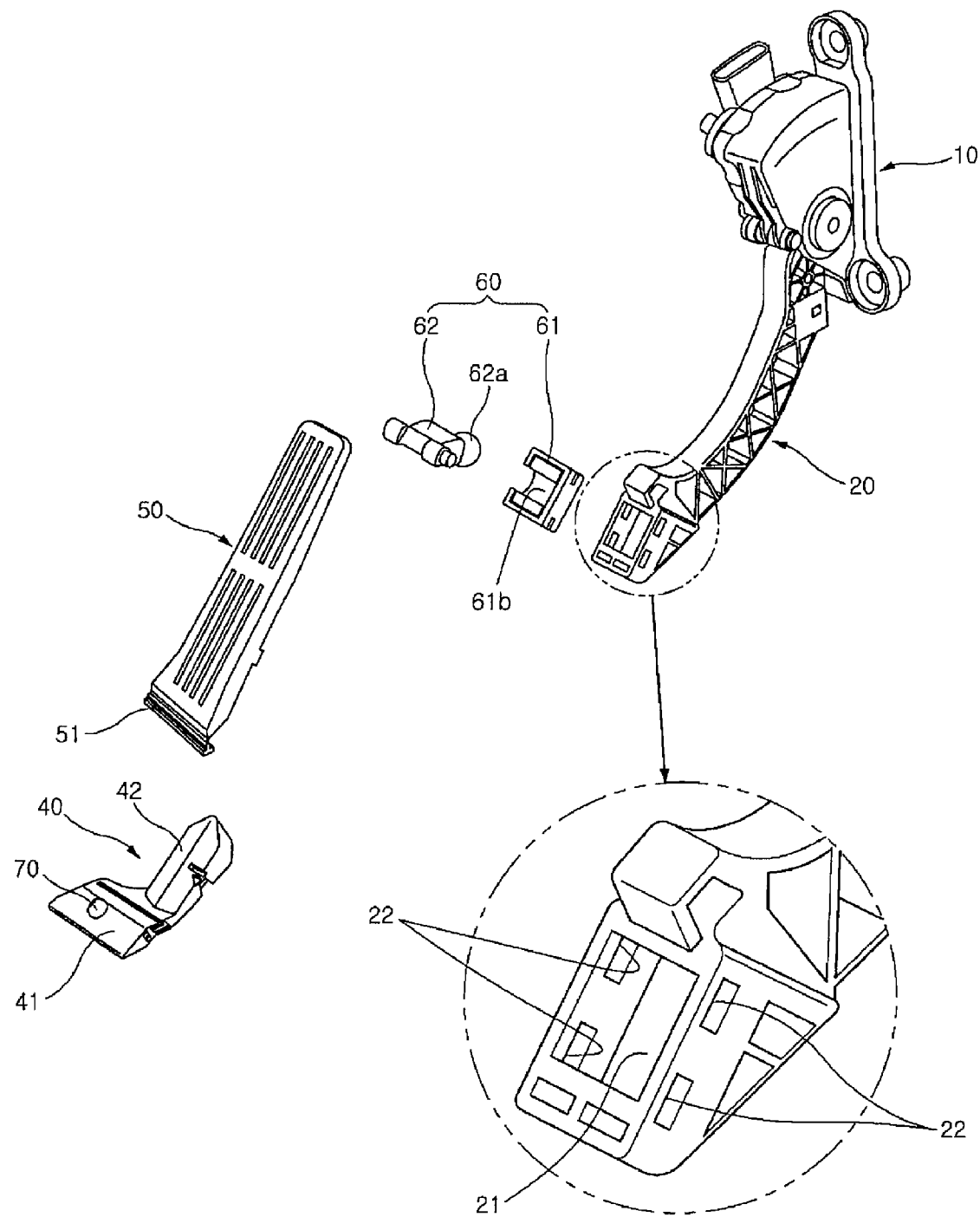

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

As shown in FIGS. 1 to 12, an organ type accelerator pedal apparatus according to various embodiments of the present invention includes a pedal arm housing 10 that is fixed to a dash panel below a driver's seat, a pedal arm 20, one end of which is pivotally connected to pedal arm housing 10, a vehicle body bracket 30 that fixed to the floor panel provided below the driver's seat, a pedal bracket 40 that is fitted to vehicle body bracket 30, a pedal 50 of which one end is rotatably hinge-connected to pedal bracket 40, and a pedal connecting module 60 that connects pedal arm 20 to pedal 50 in a ball joint connecting method.

Vehicle body bracket 30 includes a horizontal portion 31 that is fixed to a flat portion of the floor panel, and an inclined portion 32 that is integrally connected to horizontal portion 31 and fixed to a portion of the floor panel inclined upward toward the front side of a vehicle body.

In various embodiments of the present invention, at least a fitting protrusion hole 33, a guide protrusion hole 34, and a bolt hole 35 are formed at the horizontal and inclined portions 31 and 32 of vehicle body bracket 30. In detail, one fitting protrusion hole 33, which is used to be fitted to pedal bracket 40, is formed at each of horizontal and inclined portions 31 and 32. Further, one guide protrusion hole 34 used to be fitted to pedal bracket 40, and one bolt hole 35 are further formed at horizontal portion 31 in addition to fitting protrusion hole 33.

In particular, fitting protrusion holes 33, which are formed at inclined portion 32 of vehicle body bracket 30, may be cut to one side surface of vehicle body bracket 30.

Further, pedal bracket 40 includes a lower fixing portion 41 that is fitted to horizontal portion 31 of vehicle body bracket 30 and is rotatably hinge-connected to one end of pedal 50, and an upper fixing portion 42 of which one end is integrally connected to lower fixing portion 41 and the other end is formed to be inclined upward toward the front side of the vehicle body and fitted to inclined portion 32 of vehicle body bracket 30.

Pedal bracket 40 further includes fitting protrusions 43 and a guide protrusion 44, and a bolt hole 45. The fitting protrusions and the guide protrusion extend downward from the lower surfaces of lower fixing portion 41 and upper fixing portion 42, and are fitted to fitting protrusion holes 33 and guide protrusion hole 34 that are formed at vehicle body bracket 30. The bolt hole passes through the upper and lower surfaces of the pedal bracket so as to communicate with bolt hole 35 of vehicle body bracket 30.

The end of each fitting protrusions 43 of pedal bracket 40 has the shape of a protrusion (triangular section) that protrudes toward one of the left and right sides of the vehicle body, and the side surfaces of guide protrusion 44 in the left-right direction of the vehicle body are inclined so that the width of the guide protrusion is decreased toward the lower side.

The width of fitting protrusions 43 and guide protrusion 44 is smaller than that of fitting protrusion holes 33 and guide protrusion hole 34 in the left-right direction of the vehicle body, respectively.

The reason why the width of fitting protrusion holes 33 and guide protrusion hole 34 is larger than that of fitting protrusions 43 and guide protrusion 44 in the in the left-right direction of the vehicle body, respectively, is that that vehicle body bracket 30 and pedal bracket 40 have manufacturing errors. Accordingly, the degree of freedom in designing vehicle body bracket 30 and pedal bracket 40 in various embodiments of the present invention is increased, so that vehicle body bracket 30 is smoothly assembled with pedal bracket 40.

A front face 42a of upper fixing portion 42 of pedal bracket 40, which faces forward when pedal bracket 40 is seen from above, is formed in a V shape, and a connection portion between front face 42a and lower fixing portion 41 is formed in the shape of a quadrangular flat plane.

When a reference line C1 is set to divide the distance between side surfaces 42b into equal distances from a sharp vertex of front face 42a to lower fixing portion 41 in upper fixing portion 42, a left upper surface 42c and a right upper surface 42d, which are provided on both sides of reference line C1, form surfaces that are inclined downward toward side surfaces 42b of upper fixing portion 42, respectively.

The reason why front face 42a of upper fixing portion 42 is formed in the V shape and left upper surface 42c and right upper surface 42d are formed of the surfaces inclined downward toward side surfaces 42b as described above is to prevent foreign substances, which exist in a vehicle cabin, from settling on upper fixing portion 42. Accordingly, foreign substances may not come in or settle on the connection portion between pedal bracket 40 and pedal 50 (a portion corresponding to a pedal film hinge to be described below).

If foreign substances settle on the connection portion between pedal bracket 40 and pedal 50, pedal 50 may not be operated due to the foreign substances, so that an accident may occur. Therefore, the present invention prevents the above-mentioned problem from occurring.

First, the fixing structure of pedal bracket 40 and pedal 50 will be described herein.

A pedal film hinge 51, which is integrally formed with pedal 50, is provided at one end of pedal 50 so as to face pedal bracket 40.

Since the thickness of the connection portion between pedal film hinge 51 and pedal 50 is very small, pedal 50 and pedal film hinge 51 are freely bent with respect to each other by the connection portion.

A film fitting groove 46 to which pedal film hinge 51 is fitted is formed in pedal bracket 40.

Film fitting groove 46 is formed at lower fixing portion 41 of pedal bracket 40.

Film fitting groove 46 is opened at the upper surface thereof to one of the left and right direction.

When pedal film hinge 51 is fitted into film fitting groove 46, pedal film hinge 51 is maintained to be fixed to pedal bracket 40 by film fitting groove 46. However, since pedal 50 can be freely bent with respect to pedal film hinge 51, pedal 50 can be rotated with respect to pedal bracket 40.

Figure 12:
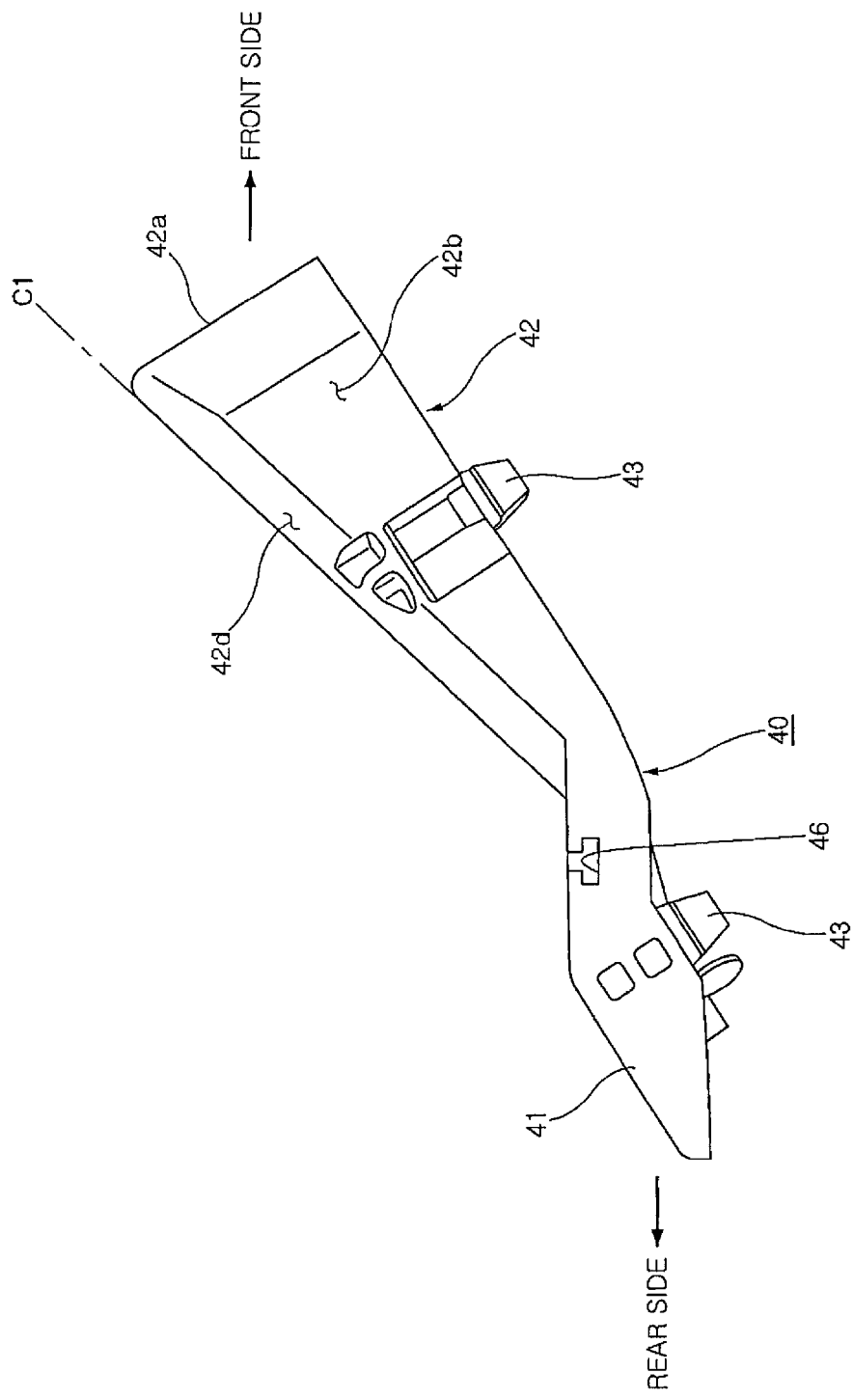
FIG. 12 is a side view of an exemplary pedal bracket.
Figure 13:
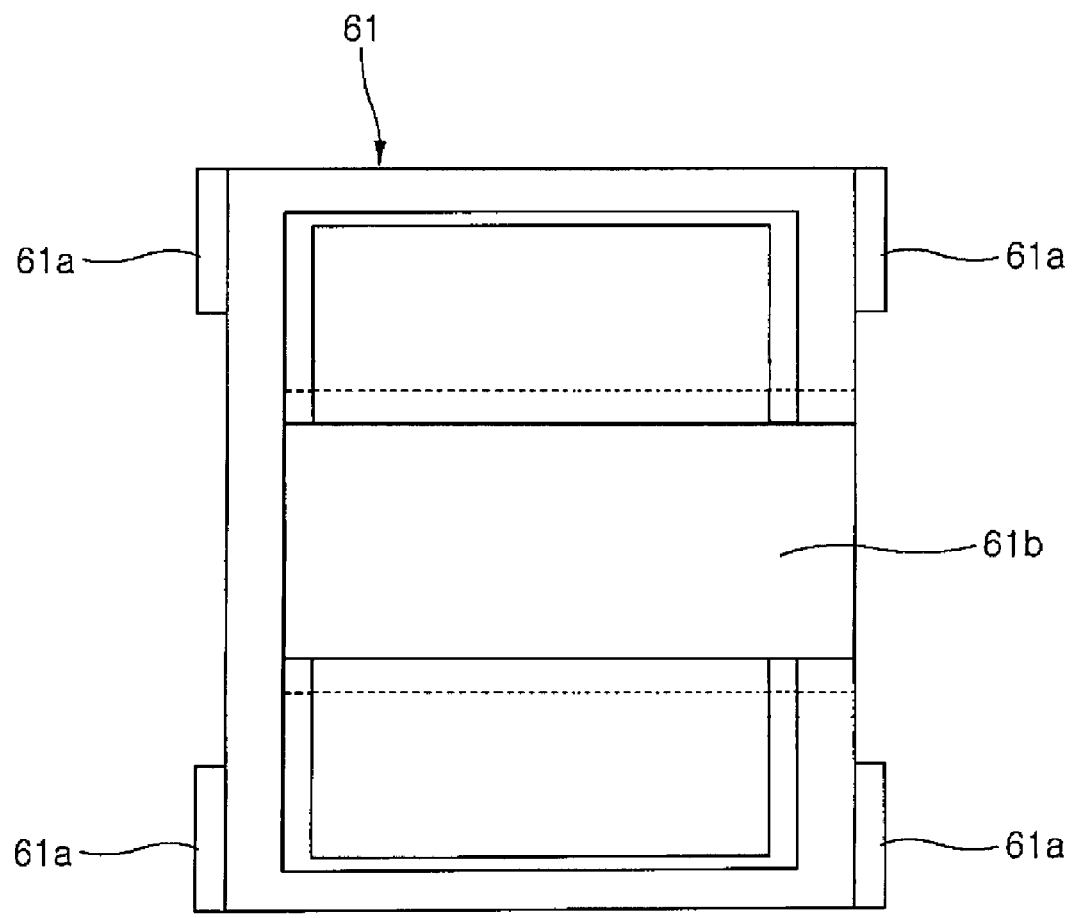
FIGS. 13 and 14 are views showing an exemplary pedal connecting module according to the present invention.
Figure 14:
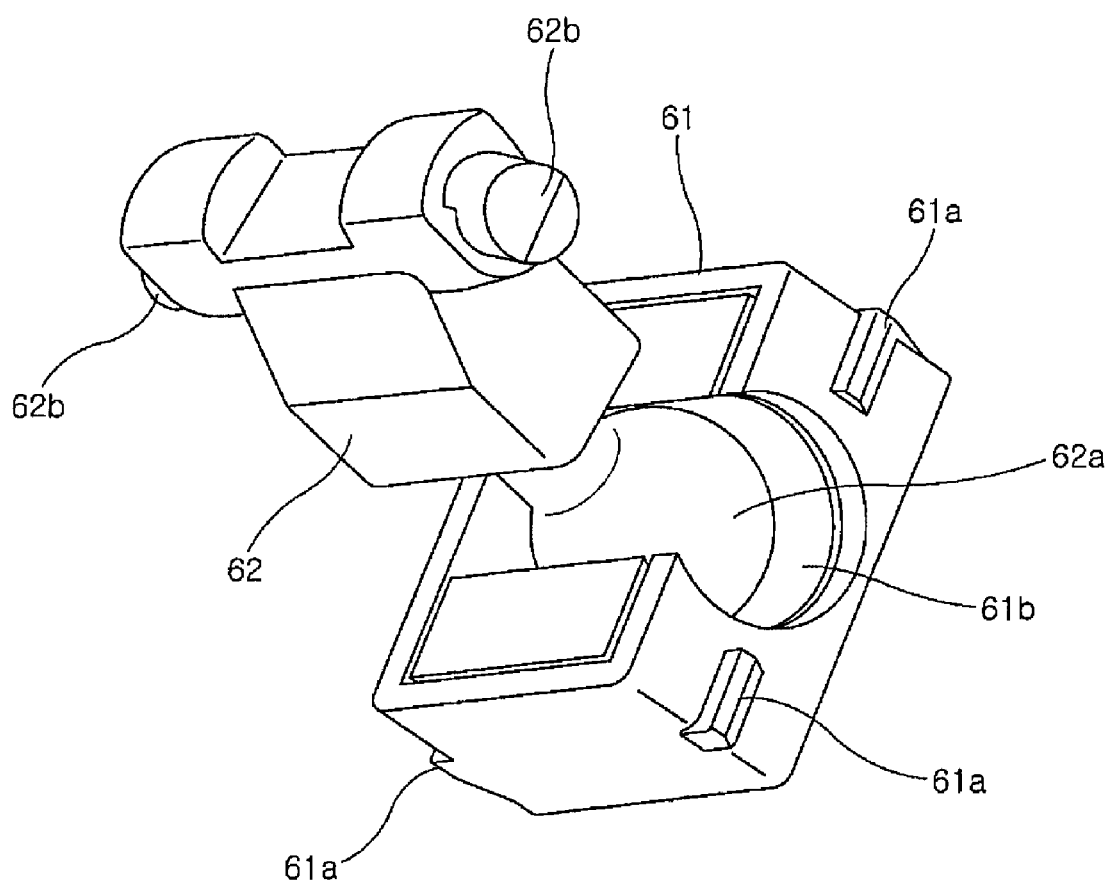
Figure 15:
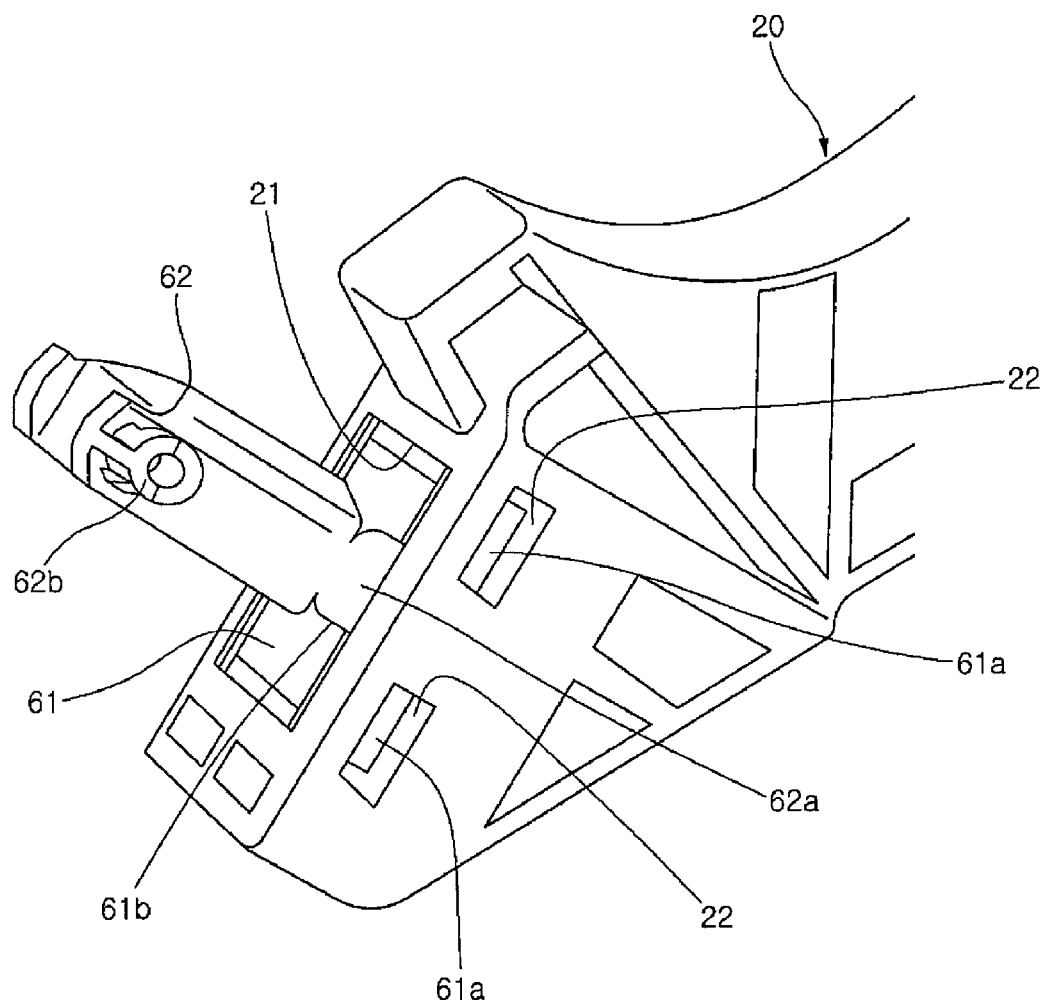
FIG. 15 is a view showing that an exemplary pedal connecting module according to the present invention is fitted to a pedal arm.
Figure 16:
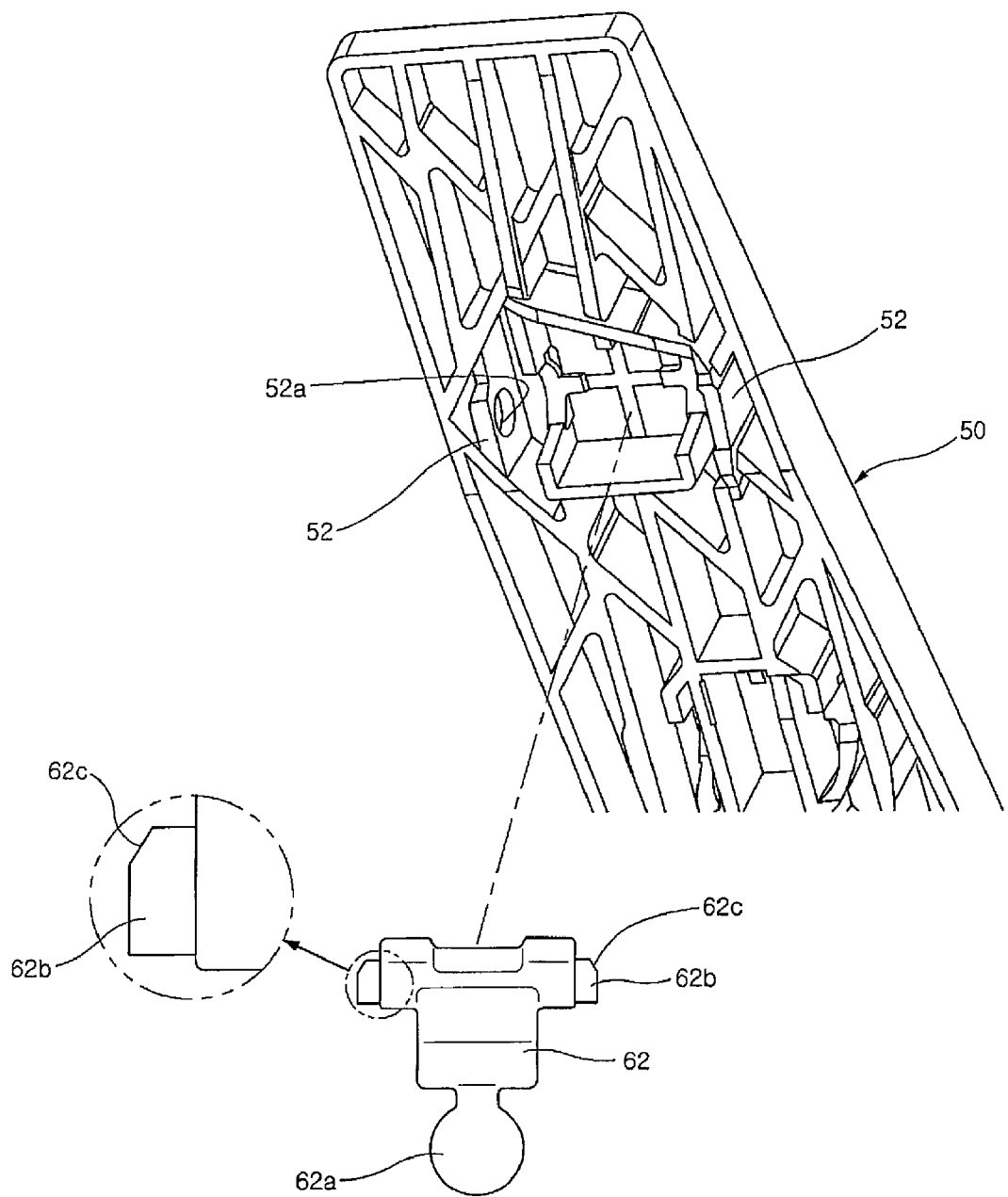
FIGS. 16 and 17 are a perspective view showing that an exemplary ball joint member according to the present invention is fitted to a pedal, and a cross-sectional view showing that the ball joint member according to the present invention has been fitted to the pedal.
Figure 17:
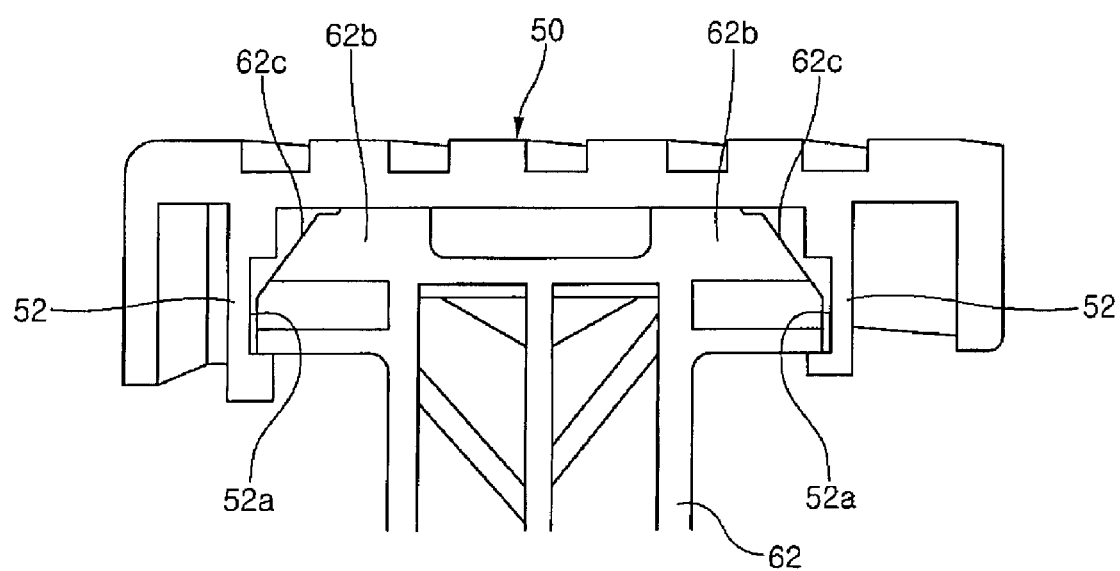

According to various embodiments of the present invention, when upper fixing portion 42 of pedal bracket 40 is seen at the side view, upper fixing portion 42 has the shape of which the thickness of a portion between one end connected to lower fixing portion 41 and front face 42a is gradually increased as shown in FIG. 12.

The reason why the thickness of upper fixing portion 42 is gradually increased toward front face 42a is to prevent a driver's ankle from being broken off toward the rear side when a collision accident occurs.

When a collision accident occurs, a driver's force applied to pedal 50 is momentarily increased. For this reason, the connection portion between pedal 50 and pedal film hinge 51 may be broken, and pedal 50 is often separated from pedal film hinge 51.

If pedal 50 is separated from pedal film hinge 51 as described above when a collision accident occurs, a driver's foot stepping on pedal 50 is suddenly moved toward the front side of the vehicle body over upper fixing portion 42 of bracket 40 together with pedal 50.

When this circumstance occur, pedal bracket 40 according to various embodiments of the present invention has the structure where the thickness of front face 42a of upper fixing portion 42 facing the front side of the vehicle body is larger than that of the portion connected to lower fixing portion 41. For this reason, the heel of the driver's foot, which is moved toward the front side of the vehicle body together with pedal 50, is caught by upper fixing portion 42. As a result, the driver's foot is not moved toward the front side of the vehicle body any more.

Accordingly, due to the shape of upper fixing portion 42, pedal bracket 40 according to various embodiments of the present invention can prevent a driver's ankle from being broken off toward the rear side when a collision accident occurs.

Further, according to various embodiments of the present invention, since it is possible to regulate the full stroke of pedal 50 by upper fixing portion 42, a driver can stably drive a vehicle.

The organ type accelerator pedal apparatus according to various embodiments of the present invention further includes a cover 70 that covers bolt hole 45 formed at pedal bracket 40.

Bolt hole 45 is formed at lower fixing portion 41 of pedal bracket 40, and it is possible to improve appearance quality by cover 70 that selectively covers bolt hole 43.

The fixing structure of vehicle body bracket 30 and pedal bracket 40 according to various embodiments will be described below with reference to FIGS. 4 to 6.

Figure 4:
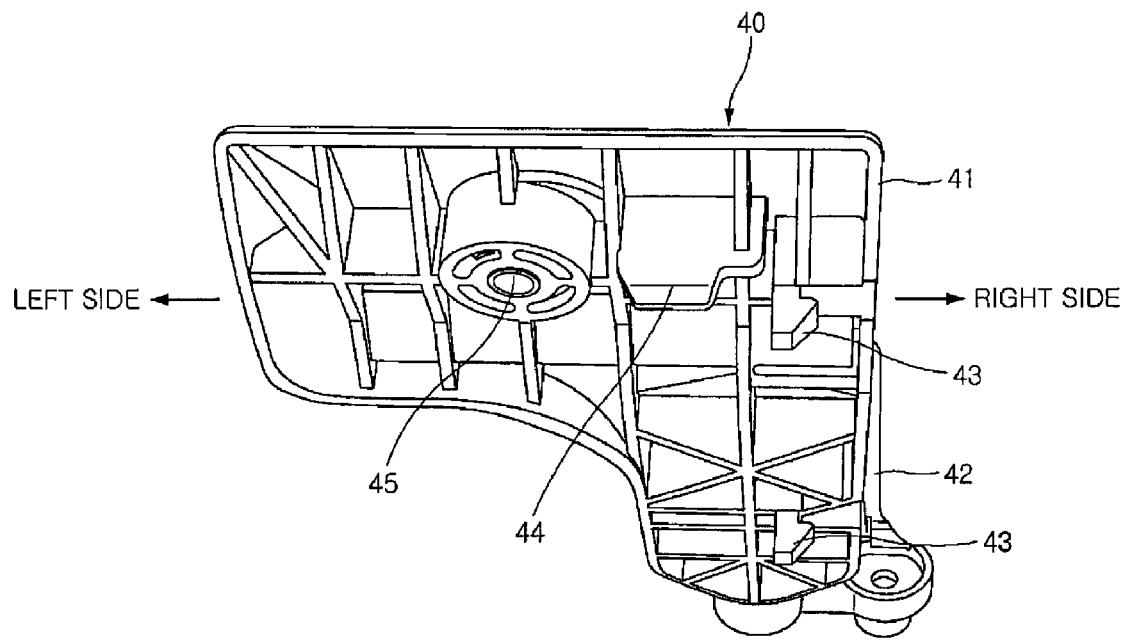
FIGS. 4 to 6 are views illustrating the fixing structure of an exemplary vehicle body bracket and pedal bracket according to the present invention.
Figure 4:
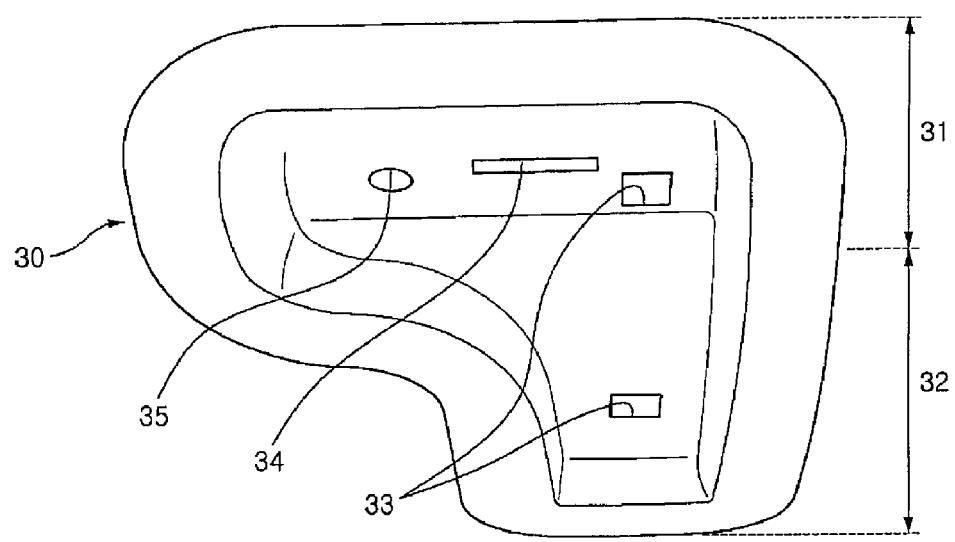
Figure 5:
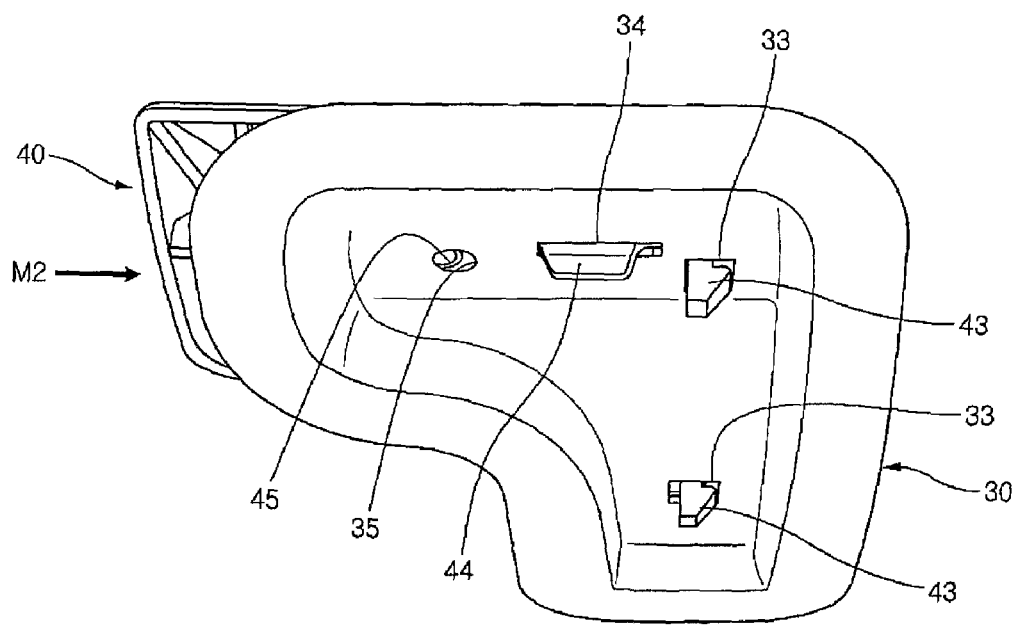

When pedal bracket 40 is moved in a direction indicated by an arrow M1 shown in FIG. 4 so that fitting protrusions 43 and guide protrusion 44, which are formed at pedal bracket 40, are fitted to fitting protrusion holes 33 and guide protrusion hole 34, respectively, pedal bracket 40 and vehicle body bracket 30 are temporarily fitted to each other as shown in FIG. 5.

Figure 6:
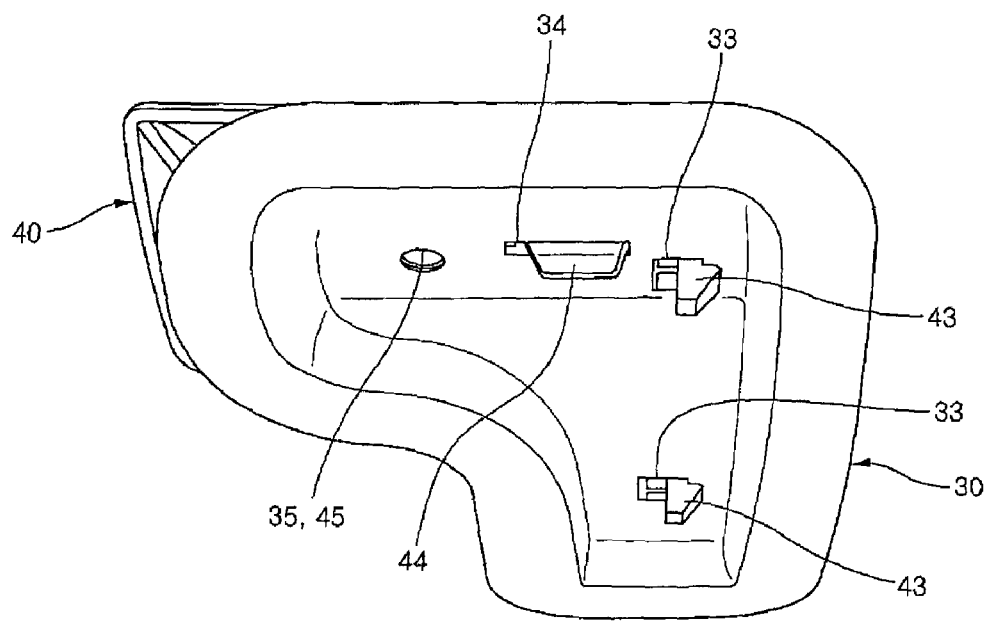

If pedal bracket 40 is moved in a direction indicated by an arrow M2 in the state shown in FIG. 5, fitting protrusions 43 is completely fitted to fitting protrusion holes 33 as shown in FIG. 6 and the center of bolt hole 45 of pedal bracket 40 coincides with that of bolt hole 35 of vehicle body bracket 30.

If a bolt is fastened to bolt holes 35 and 45 in the state of FIG. 6, pedal bracket 40 is fixed to vehicle body bracket 30 by a fitting force between fitting protrusions 43 and fitting protrusion holes 33 and a fixing force of the bolt.

The fixing structure of a vehicle body bracket 30 and a pedal bracket 40 according to various embodiments will be described with reference to FIGS. 7 to 9.

Figure 7:
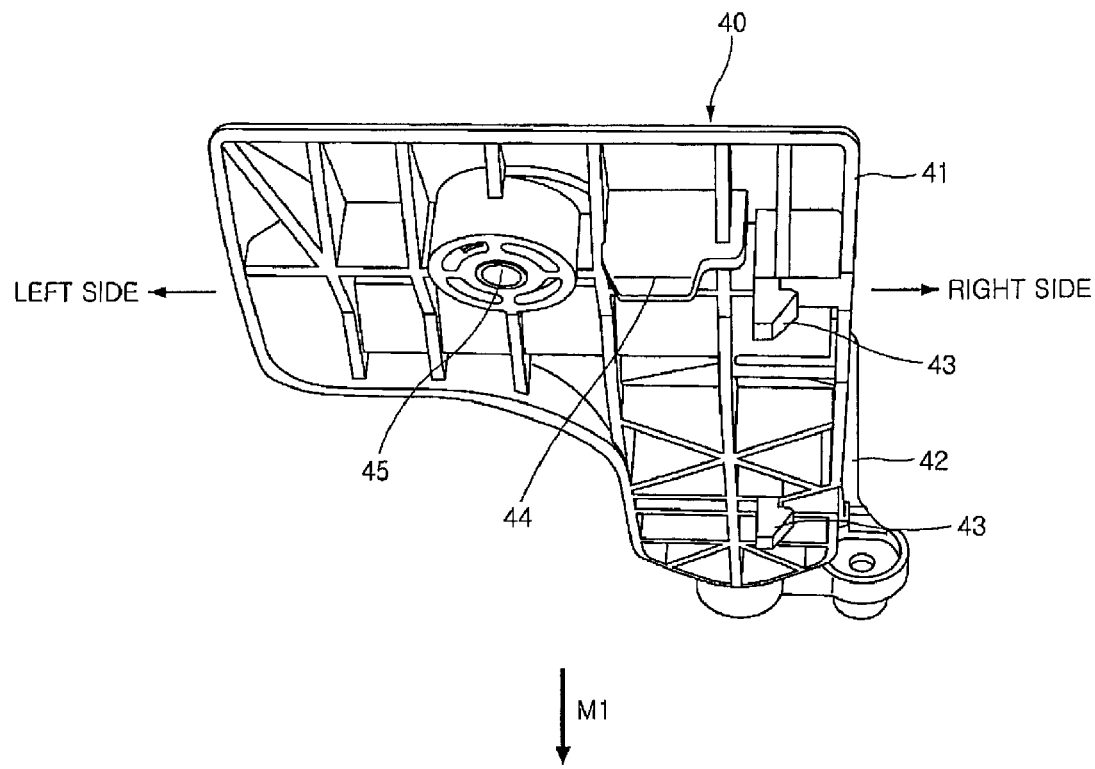
FIGS. 7 to 9 are views illustrating the fixing structure of an exemplary vehicle body bracket and pedal bracket according to the present invention.
Figure 7:
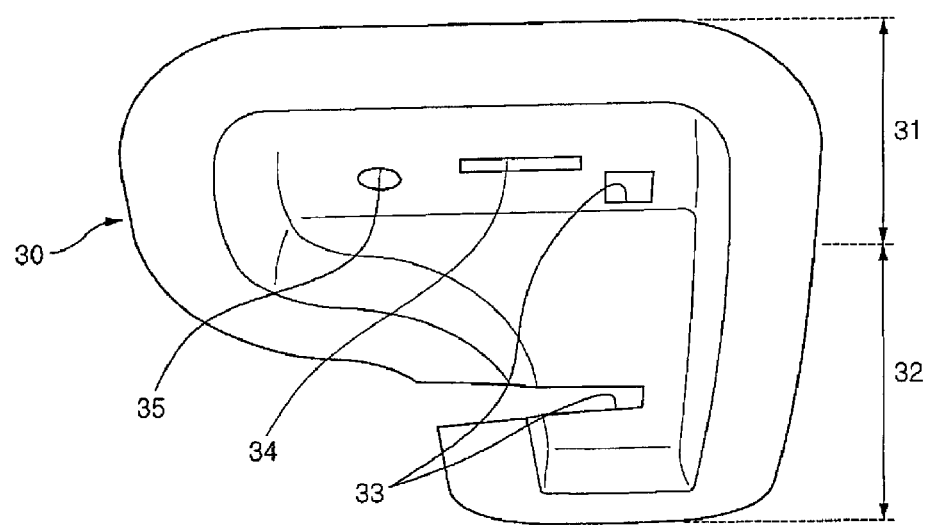
Figure 8:
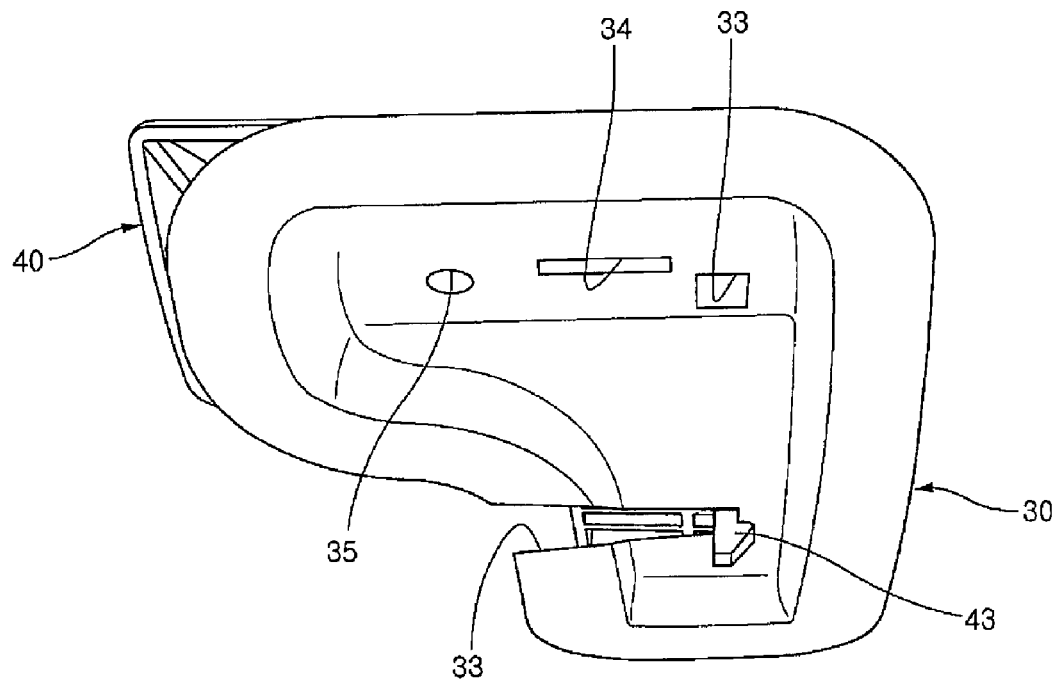

When pedal bracket 40 is moved toward vehicle body bracket 30 in a direction indicated by an arrow M1 shown in FIG. 7, first, only fitting protrusions 43 formed at upper fixing portion 42 of pedal bracket 40 are fitted to fitting protrusion hole 33 formed at inclined portion 32 of vehicle body bracket 30 as shown in FIG. 8.

If pedal bracket 40 is pressed against vehicle body bracket 30 after fitting protrusion 43 of upper fixing portion 42 are fitted to fitting protrusion hole 33 of inclined portion 32 as described above, the other fitting protrusion 43 formed at lower fixing portion 41 of pedal bracket 40 is fitted to fitting protrusion hole 33 formed at horizontal portion 31 of vehicle body bracket 30 in a one-touch manner, and guide protrusion 44 formed at pedal bracket 40 is also fitted to guide protrusion hole 34 of vehicle body bracket 30. As a result, pedal bracket 40 and vehicle body bracket 30 are completely assembled with each other as shown in FIG. 9.

In this case, the center of bolt hole 45 of pedal bracket 40 completely coincides with that of bolt hole 35 of vehicle body bracket 30.

Figure 9:
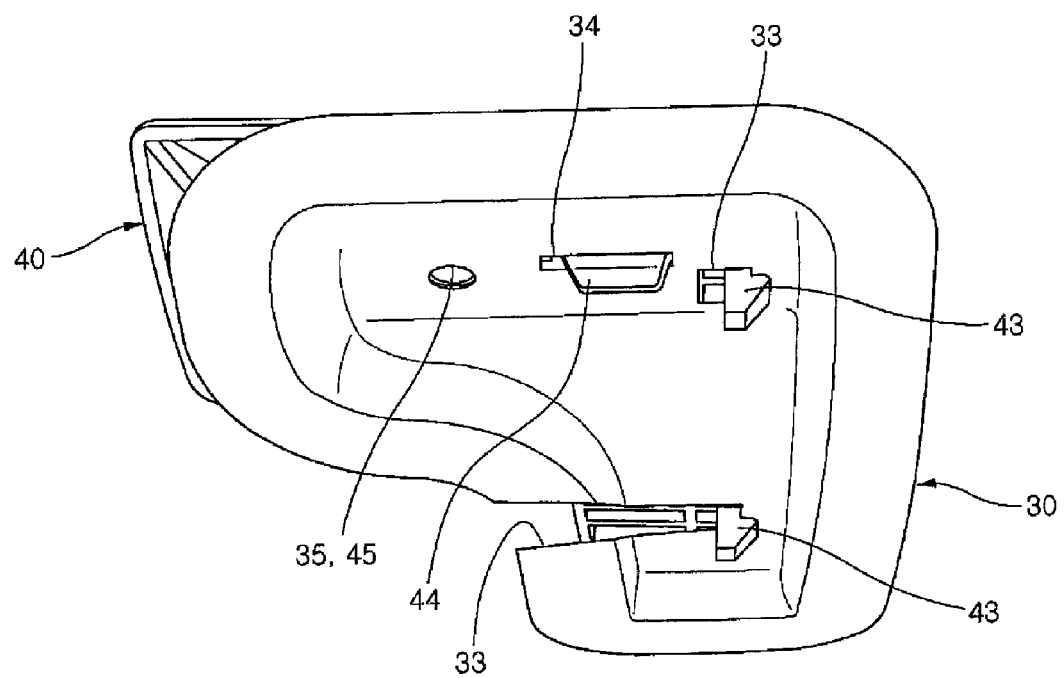
Figure 10:
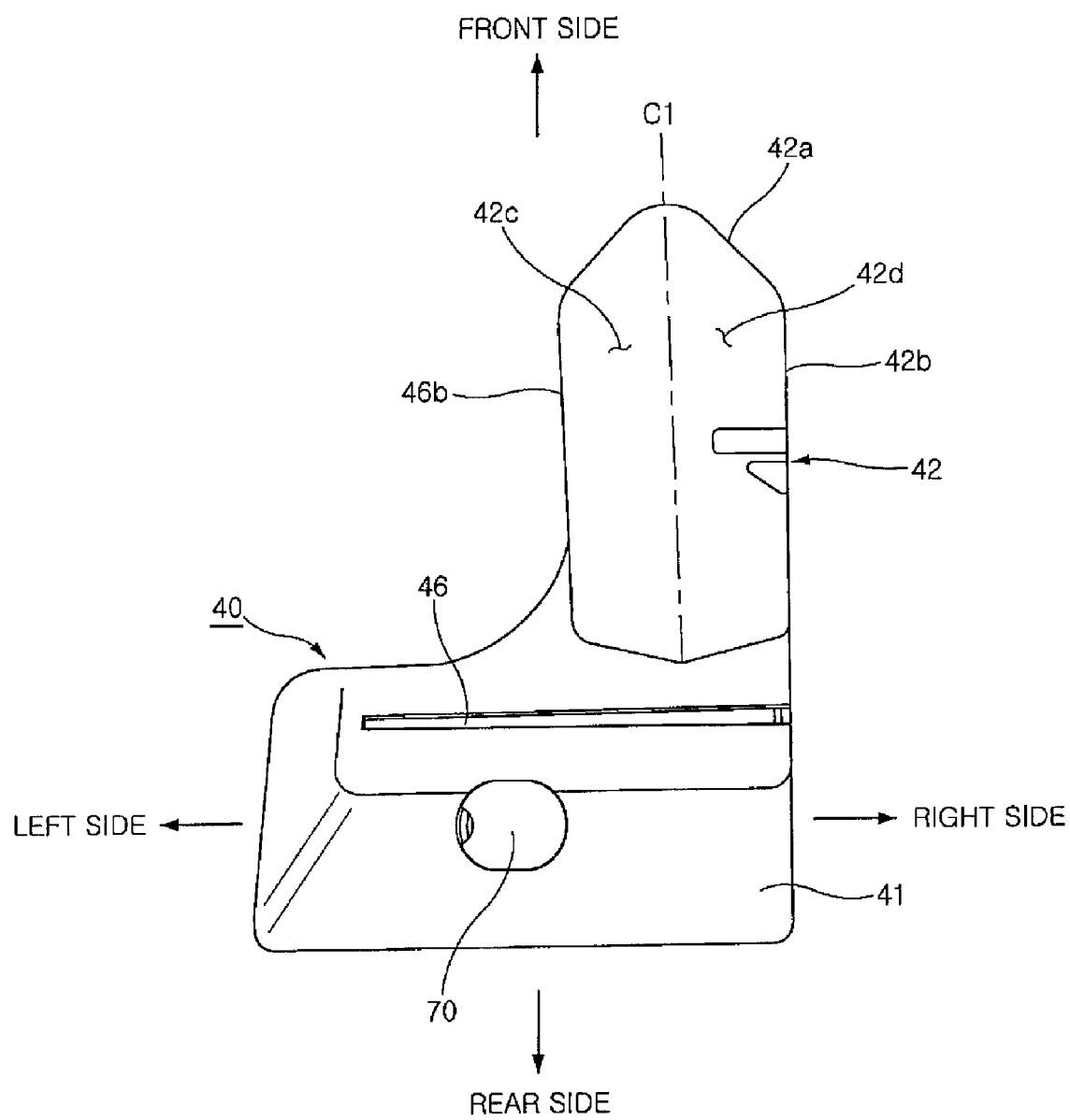
FIG. 10 is a plan view of an exemplary pedal bracket according to the present invention.
Figure 11:
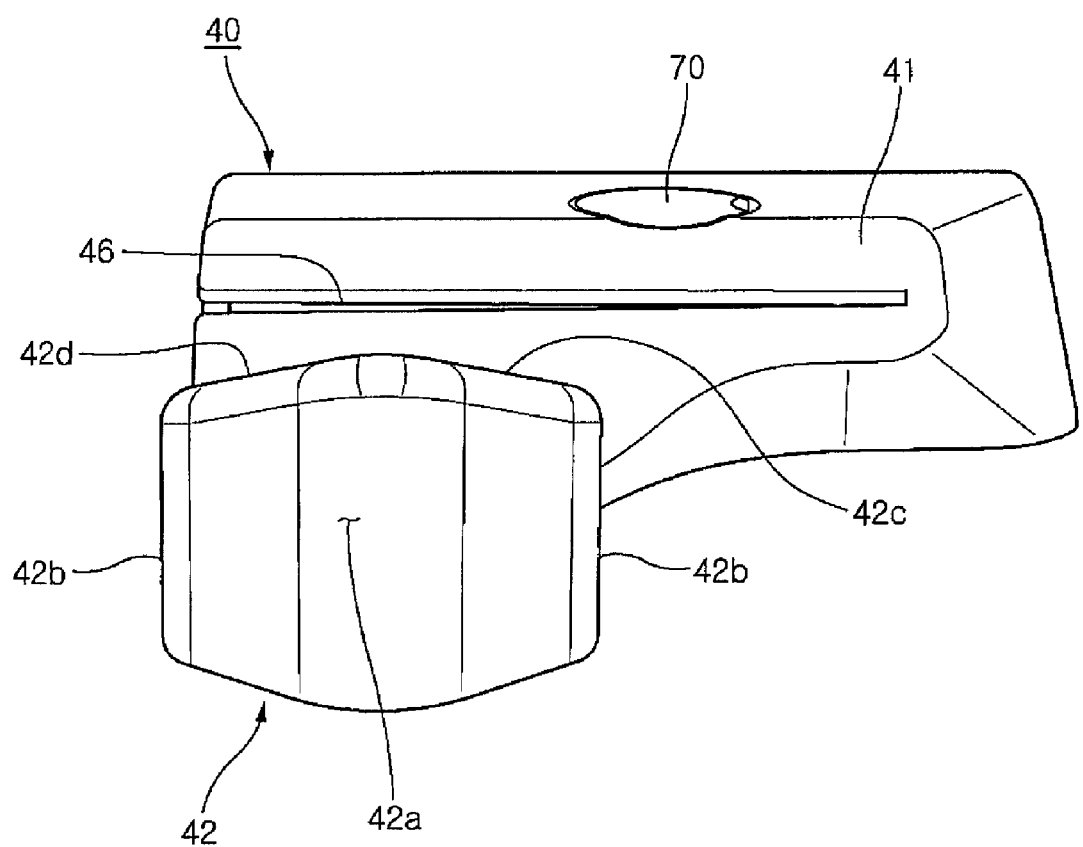
FIG. 11 is a front view of an exemplary upper fixing portion.

Since the embodiment shown in FIGS. 7 to 9 has the fixing structure using a one-touch manner, it is possible to improve convenience in working and to reduce working time as compared to the embodiment shown in FIGS. 4 to 6.

Pedal connecting module 60 will be described below with reference to FIGS. 13 to 17.

Pedal connecting module 60 includes a ball joint housing 61 and a ball joint member 62. The ball joint housing is formed in a rectangular parallelepiped shape, includes a plurality of fitting protrusions 61a on the outer periphery thereof and a ball fitting groove 61b that is opened at an upper surface and one outer side thereof, and is fitted to pedal arm 20. The ball joint member includes a ball 62a that is fitted to ball fitting groove 61b at one end thereof, and fitting pins 62b that are formed on both side surfaces of the other end thereof and fitted to the lower surface of pedal 50.

In order to mount pedal connecting module 60, pedal arm 20 includes a quadrangular housing fitting groove 21 into which ball joint housing 61 is fitted, and a protrusion fitting hole 22 into which fitting protrusion 61a of ball joint housing 61 is fitted is formed at housing fitting groove 21 so as to pass through the side surface of pedal arm 20.

A pair of ribs 52, which includes rib grooves 52a into which fitting pins 62b of ball joint member 62 are fitted, is formed on the lower surface of pedal 50 so as to face each other.

In order to make ball joint member 62 be easily fitted to pedal 50, slopes 62c are formed at a part of the outer peripheries of fitting pins 62b so that fitting pins 62b are smoothly fitted to rib grooves 52a.

The reason why pedal connecting module 60 used to fix pedal arm 20 to pedal 50 has the structure corresponding to the ball joint connecting method as described above is to perform smooth assembly in consideration of manufacturing errors of pedal arm 20 and pedal 50, thereby increasing the degree of freedom in designing pedal arm 20 and pedal 50.

According to various embodiments of the present invention, the quality deterioration caused by assembling distribution does not occur due to the ball joint connecting method and clearance is not generated. Therefore, it is possible to significantly improve driver's operation feeling.

Since the degree of freedom in designing each component is increased as described above, it is possible to smoothly assemble each component in the accelerator pedal apparatus according to various embodiments of the present invention and to improve driver's operation feeling after the assembling of each component.

Furthermore, when a collision accident occurs, it is possible to prevent a driver's ankle from being broken off toward the rear side and to regulate the full stroke of pedal 50 by upper fixing portion 42. Therefore, a driver can stably drive a vehicle.

Meanwhile, pedal bracket 40 has been fixed to the floor panel below the driver's seat by vehicle body bracket 30 in the above-mentioned embodiments of the present invention. However, pedal bracket 40 may be directly fixed to the floor panel below the driver's seat.

If pedal bracket 40 is directly fixed to the floor panel below the driver's seat as described above, holes into which fitting protrusions 43 and guide protrusion 44 of pedal bracket 40 are inserted are formed at the floor panel together with a hole communicating with hole 45 of pedal bracket 40.

In this case, the number of the holes, to which fitting protrusions 43 of pedal bracket 40 are fitted, among the holes formed at the floor panel, is two. One hole of the two holes is formed of an elongated groove of which both ends are elongated toward the side surfaces of the vehicle body 5, and fitting protrusion 43 of upper fixing portion 42 of vehicle body bracket 40 is inserted into the hole formed of the elongated groove.

For convenience in explanation and accurate definition in the appended claims, the terms "upper" or "lower", "front" or "rear", "inside" or "outside", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An organ type accelerator pedal apparatus comprising:
   a pedal, an upper portion of which is pivotally coupled to a lower portion of an pedal arm, the pedal to which a driver applies a force to rotate the pedal arm;
   a pedal bracket pivotally connected with a lower portion of the pedal, wherein the pedal bracket includes a fitting protrusion, a guide protrusion, and a fitting hole used to be fixed to a vehicle body; and
   a vehicle body bracket that includes a plurality of holes, into respective ones of which the guide protrusion is slidably fitted and the fitting protrusion is snap-fitted, the vehicle body bracket further including a hole communicating with the fitting hole of the pedal bracket to receive a fixing member therethrough wherein the fixing member couples the pedal bracket to the vehicle body bracket.

2. The organ type accelerator pedal apparatus as defined in claim 1, wherein the pedal arm is pivotally coupled to a pedal arm housing fixed to the vehicle body.

3. The organ type accelerator pedal apparatus as defined in claim 1, wherein the fitting protrusion comprises:
   a body protruding downward from a lower surface of the pedal bracket, and a protrusion, formed at an end portion of the body and protruding in substantially perpendicular direction to the body.

4. The organ type accelerator pedal apparatus as defined in claim 1, wherein the guide protrusion protrudes downward from a lower surface of the pedal bracket and a side surface of the guide protrusion substantially in a traverse direction of the vehicle body is inclined so that a width of an upper portion at the guide protrusion in the traverse direction of the vehicle body is decreased toward a tip thereof.

5. The organ type accelerator pedal apparatus as defined in claim 1, wherein the pedal bracket includes:
   a lower fixing portion which is formed in parallel to a portion of the vehicle body to which the pedal bracket is fixed, wherein the lower portion of the pedal is rotatably hinge-connected thereto; and
   an upper fixing portion, one end of which is integrally connected to the lower fixing portion and the other end of which is formed to be inclined upward toward a front side of the vehicle body.

6. The organ type accelerator pedal apparatus as defined in claim 5, wherein the fitting protrusion and the guide protrusion, protrude downward from a lower surface of the lower fixing protrusion, and the fitting hole passes through upper and lower surfaces of the lower fixing portion, and
   wherein another fitting protrusion protrudes downward from a lower surface of the upper fixing portion.

7. The organ type accelerator pedal apparatus as defined in claim 5, wherein a front face of the upper fixing portion, which faces forward when the pedal bracket is seen above the vehicle body, is formed in a reverse V shape.

8. The organ type accelerator pedal apparatus as defined in claim 7, wherein a connection portion between the front face and the lower fixing portion is formed in the shape of a quadrangular flat plane.

9. The organ type accelerator pedal apparatus as defined in claim 8, wherein when a reference line is set to divide the distance between side surfaces into equal distances from a vertex of the front face to the lower fixing portion in the upper fixing portion, a left upper surface and a right upper surface, which are provided on both sides of the reference line, form surfaces that are inclined downward toward the side surfaces of the upper fixing portion, respectively.

10. The organ type accelerator pedal apparatus as defined in claim 1, wherein among the holes formed at the vehicle body bracket, the hole to which the fitting protrusion of the pedal bracket is fitted is cut to one side surface of the vehicle body bracket to form a slot.

11. The organ type accelerator pedal apparatus as defined in claim 1, wherein the width of the fitting protrusion and the guide protrusion is smaller than the holes of the vehicle body bracket coupled respectively therebetween.

12. The organ type accelerator pedal apparatus as defined in claim 1, wherein the upper portion of the pedal and the lower portion of the pedal arm are coupled by a pedal connection module comprising a ball joint housing connected to the pedal arm and a ball joint member connected to the pedal.

13. A passenger vehicle comprising the organ type accelerator pedal apparatus as defined in claim 1.

* * * * *